(12) United States Patent
Egerer et al.

(10) Patent No.: US 6,466,041 B1
(45) Date of Patent: Oct. 15, 2002

(54) METHOD FOR SETTING THE TRIGGER POWER OF TRANSMITTER DIODES

(75) Inventors: Jens Egerer, Erlangen (DE); Johann Hauer, Erlangen (DE); Michael Reinhold, Erlangen (DE); Rainer Rodenheber, Heilbronn (DE)

(73) Assignees: TEMIC Semiconductor GmbH, Heilbronn (DE); Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 78 days.

(21) Appl. No.: 09/672,291

(22) Filed: Sep. 27, 2000

(30) Foreign Application Priority Data

Sep. 27, 1999 (DE) .......................... 199 46 218

(51) Int. Cl.[7] .............................................. G01R 31/308
(52) U.S. Cl. ...................... 324/753; 324/239; 324/433; 324/539; 702/109
(58) Field of Search ............................. 324/750, 753, 324/755, 239, 539, 541, 103 R, 640, 433; 359/110, 125; 370/276; 455/557; 702/109, 118, 121; 340/539, 650; 361/111, 113

(56) References Cited

U.S. PATENT DOCUMENTS

| | | | |
|---|---|---|---|
| 4,954,731 A | 9/1990 | Dhong et al. | |
| 5,216,667 A | * 6/1993 | Chu | .......................... 370/276 |
| 5,446,783 A | * 8/1995 | May | .......................... 455/557 |
| 5,469,285 A | * 11/1995 | Gut | .......................... 359/125 |
| 5,517,608 A | 5/1996 | Suzuki et al. | |
| 5,790,286 A | * 8/1998 | Bae | .......................... 359/110 |

FOREIGN PATENT DOCUMENTS

DE          2539624          3/1976

* cited by examiner

Primary Examiner—Michael Sherry
Assistant Examiner—Trung Nguyen
(74) Attorney, Agent, or Firm—W. F. Fasse; W. G. Fasse

(57) ABSTRACT

A method for setting the trigger power of transmitter diodes that transmit data via optical paths allows the transmission power to be adjusted and adapted to the communication distance. The trigger power is determined for the present communication distance on the basis of a test signal before data transmission begins. A circuit arrangement implementing the method includes a driver circuit with a switching device that switches a circuit junction point selectively to a supply voltage or to a constant reference voltage, a voltage-controlled resistor which delivers the driver current and is controlled from the circuit junction point, and a voltage-controlled measuring resistor which delivers a measured current with a fixed relationship to the driver current and is controlled from the circuit junction point. Since the set trigger power can be reduced, the power consumption for data transmission can be reduced considerably.

16 Claims, 3 Drawing Sheets

METHOD FOR SETTING THE TRIGGER POWER OF TRANSMITTER DIODES

BACKGROUND

1. Field of the Invention

The present invention relates to a method for setting the trigger power of a transmitter diode for optical data transmission by means of a first transceiver unit and a second transceiver unit.

2. Description of the Related Technology

Data transmission via optical paths, for example in the infrared wavelength range, is applied preferably for short distances, for example for communication from mobile phones and notebooks to personal computers (PCs). Another application is for data exchange between printers and PCs. Transmission is standardized and takes place in most cases in systems operating in the infrared range on the basis of a so-called IrDa protocol (IrDa=Infrared Data Association). Since data transmission takes place bidirectionally, combined transmitter and receiver units, made from so-called transceiver circuits for operating the transmitter and receiver diodes, are used in such components. The transceiver circuits in turn consist of a receiver circuit, a transmitter circuit, also known as a driver circuit, and an interface circuit which regulates the data exchange between the processor and the transmission and receiver circuit. The transmitter diodes used for data transmission are controlled from the driver circuit that converts the digital input signal, supplied via the interface circuit from a processor for example, into a current pulse. Depending on the transmission power of the transmitter unit, characteristics of the transmission path and sensitivity of the receiver system, the communication distance for data transmission in the infrared range is between 30 cm and 3 meters at the most. Because of the requirement to also transmit visual information within a reasonable time, systems are now made with transfer rates of 4Mbit/s. Since with higher transfer rates the demands imposed on the transmission paths also rise sharply, it is possible within the scope of the IrDa protocol for example to reduce the data rates under unfavorable transmission conditions.

In the case of the known state-of-the-art methods, the transmitter diodes are controlled from the driver circuits with fixed current values. These can either not be varied by the user, such as the 115.2 kbit/s infrared transceiver HSDL 3201 from Hewlett Packard, or they can be selected by the user with a fixed value, as in the case of the IRMS6100 from Infineon, or they can be set by the user to a fixed value by means of an external resistor, as in the case of the TSLM1100 transceiver from Texas Instruments.

It is a disadvantage of the method operating in accordance with the known state of the art that the transmission power which is set once is determined by the system and cannot be varied by the user or alternatively only with great effort, for example by using external components. Since for many devices that are not dependent on supply networks, such as mobile phones or notebooks for example, the power consumption is a critical factor, the communication distance is frequently limited to values under 1 meter, for example, by reducing the trigger power by a fixed predetermined amount. In conjunction with the transmission of ever increasing data volumes, the power consumption also rises rapidly. Since the battery capacity of the mobile devices is very limited and the operating time in the case of notebooks and mobile phones in particular is a decisive factor, ways must be found to keep the power consumption low for infrared data transmission on the one hand, and on the other hand to achieve as large a communication distance as possible and at the same time to prevent a drop in the data rates in order to rapidly transfer even large data volumes.

SUMMARY OF THE INVENTION

The object of the present invention is to provide a method with which the trigger power of the transmitter diodes can be set according to the communication distance. A further object of the invention is to specify a circuit arrangement for performing the method and which can be manufactured simply and at low cost.

According to the present invention, this object is achieved by the trigger power of a transmitter diode, from which a test signal is output, being modified appropriately in a first transceiver unit until a response signal is received with the currently set trigger power and the trigger power from the first transceiver unit is stored.

The further object is achieved by virtue of a driver circuit for supplying a driver current to an electronic data transmission component with:

a switching device that in a first state connects a circuit junction point to a supply voltage and disconnects from a constant reference current, and in a second state disconnects the circuit junction point from the supply voltage and connects to the constant reference current;

a voltage-controlled resistor to the input of which the supply voltage is applied, from the output of which the driver current is delivered, and whose control input is connected to the circuit junction point; and a voltage-controlled measuring shunt to the input of which the supply voltage is applied, from the output of which a measured current is delivered having a preset relationship to the driver current, and whose control input is connected to the circuit junction point, the measured current being coupled to the circuit junction point with a sign that is inverted in relation to the constant reference current.

Accordingly, the essence of the invention consists in modifying the trigger power of a transmitter diode from a first transceiver unit that outputs a test signal until such time as a response signal is received from a second transceiver unit with the currently set trigger power. When this is the case, the value of the trigger power is stored by the first transceiver unit. A following data transmission session is preferably performed with the trigger power value last stored.

Studies carried out by the applicant have shown that it is advantageous for the value of the set trigger power to be modified only when no response signal has been received within a time window that begins with the output of the test signal. A test signal with modified trigger power is then output in a subsequent time window.

In a further development of the method according to the invention, a check is made at the very beginning to determine whether data transmission is possible under the existing transmission conditions that prevail due to the system configuration. For this purpose, the test signal is output with the maximum trigger power during the first time window and, provided a response signal is received, the trigger power is reduced successively in subsequent time windows. It is an advantage compared with the known state of the art that with little additional time considerably less power is needed for data transmission.

In another further development of the method according to the invention, the test signal is output with minimum trigger power during a first time window and the trigger power is increased successively with each further time window until a response signal is received. If in addition the response signal is returned with maximum transmission power, the transmission characteristics of the return path can thus be blanked out.

In order to keep the power consumption low during the setting phase, it is advantageous to generate as test signal a signal that varies with time by triggering the transmitter diode with pulses that are as short as possible. In the case of a longer data transmission session or if data transmission is interrupted, it is also advantageous to repeat the setting of the trigger power by generating the test signal with the trigger power value last stored.

Studies carried out by the applicant have shown that it is advantageous for the modification of the trigger power when the current through the transmitter diode, referred to as driver current hereinafter, is varied by the driver circuit in the transceiver unit which comprises an interface circuit, a receiver circuit and a driver circuit.

For this purpose, the present new circuit arrangement can be used advantageously to implement the method according to the invention. It provides a driver circuit for supplying a driver current to an electronic data transmission component, such as a transmitter diode for example, with the following characteristics: a switching device which in a first state connects a circuit junction point to a supply voltage and disconnects from a reference current source, and in a second state disconnects the circuit junction point from the supply voltage source and connects to a constant reference current source; a voltage-driven resistor, the control input of which is connected to the circuit junction point; and a voltage-controlled measuring shunt to the input of which the supply voltage is applied and from the output of which a measuring current is supplied having a fixed relationship to the driver current and whose control input is connected to the circuit junction point, the measuring current being linked to the circuit junction point with a sign that is the inverse of that of the constant reference current.

The advantage of the driver circuit of the present invention compared with the state of the art is due to the fact that it permits the level of the current pulses to be set and a high data rate at high currents. Thus, for example, precise current pulses can be generated with settable or programmable current at a high data transfer rate of several Mbits. This settability makes it possible to utilize the minimum necessary current intensity for the actual transmission path in order on the one hand to cover long paths and on the other to minimize current consumption and thereby to extend the battery life. Furthermore, it is an advantage that the load can be connected to-ground.

In particular, this is achieved by a measuring transistor and an output transistor which are so connected that the output current flowing through the output transistor is a fixed multiple of the current flowing through the measuring transistor. The control inputs of the two transistors are joined at a common junction point which is discharged by the reference current and charged by the current which flows through the measuring transistor. In a steady-state condition, the output current is therefore regulated to a fixed multiple of the reference current.

In one example of embodiment, the driver circuit is used for an infrared transmitter diode for wireless communication in accordance with the IrDA standard, the driver circuit being in CMOS technology. MOS transistors are used as voltage-controlled measuring resistors, designed such that the current flowing through the voltage-controlled resistor is a fixed multiple of the current flowing through the voltage-controlled measuring resistor, the relationship between these two currents being settable by the ratio of the transistor widths of the two voltage-controlled resistors at the time of designing the circuit. In addition, the measured current is linked via two series-connected current mirrors to the circuit junction point that is connected to the control terminals of the two transistors so that voltage decoupling is achieved between the measuring transistor and the circuit junction point.

Whereas in the driver circuit described above the driver current is set by means of the reference current, alternatively several driver circuits according to the invention can be used in order additionally or alternatively to the varying of the supplied reference current to set the driver current by connecting or disconnecting the driver circuits whose outputs are connected together for addition of the currents and each of which supplies a fixed driver current. A circuit arrangement of this kind is advantageous because, due to the division of the driver stage into identical blocks, the making capacity and the speed depend largely on the technology and operating parameters and not on the current that has been set.

The advantages of the present invention are also due to the fact that, with the driver circuit according to the invention, regulated driver current can be generated faster and the driver current varies only slightly with changes in the supply voltage applied, and with temperature and technology variations.

BRIEF DESCRIPTION OF THE FIGURES

The invention will now be described on the basis of preferred example embodiments with reference to the drawings and explained in more detail. The Figures show.

DESCRIPTION OF THE PREFERRED EMBODIMENTS

Figure 1:
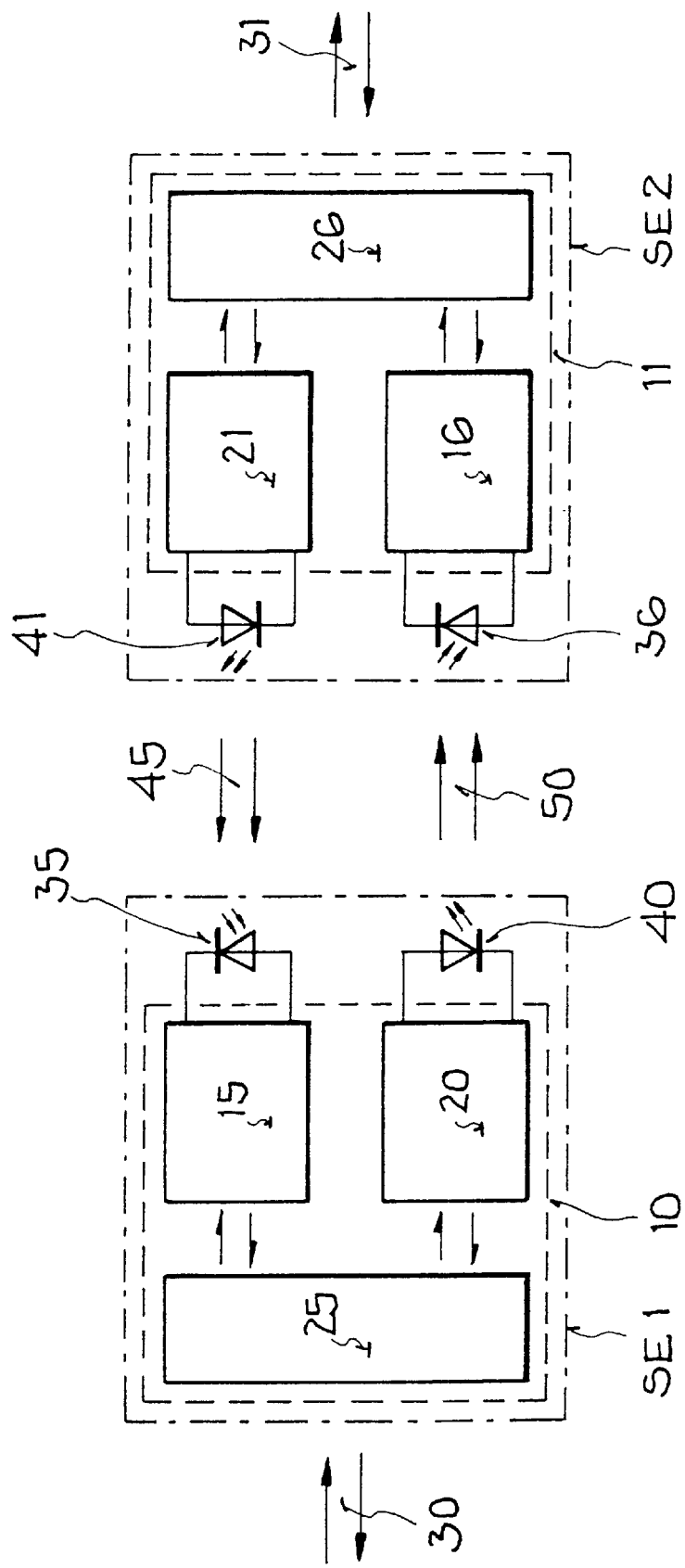
FIG. 1 An optical data transmission system with two transceiver units and a block diagram of a transceiver unit.

The object of the transceiver units SE1 and SE2 shown in FIG. 1 is to exchange data in the optical range over short distances. For this purpose, a first transceiver unit SE1 is, for example, built into a mobile phone or notebook and a second transceiver unit SE2 is, for example, integrated in a PC. In accordance with the method according to the invention, the trigger power needed for the relevant distance is set before data transmission by means of a test signal.

Each of the transceiver units SE1 and SE2 has an integrated transceiver circuit 10 and 11 respectively and each has a transmitter diode 40 and 41 respectively and a receiver diode 35 and 36 respectively. The transceiver circuits 10 and 11 consist of a receiver circuit 15 and 16 respectively, a driver circuit 20 and 21 respectively and an interface circuit 25 and 26 respectively. The interface circuits 25 and 26 are connected on the one hand to a processor (not shown) in order to exchange input/output signals 30 and 31 respectively, and on the other to the receiver circuits 15 and 16 respectively and to the driver circuits 20 and 21 respectively. The receiver diodes 35 and 36, which transform the received light pulses 45 into current pulses, are connected to the receiver circuits 15 and 16 respectively. The transmitter diodes 40 and 41, which transform the current pulses into light pulses 46, are connected to the driver circuits 20 and 21 respectively.

The task of the first transceiver circuit SE1 is to output a test signal before data transmission by triggering the transmitter diode 40 from the driver circuit 20 by means of a short current pulse and then waiting within a predetermined time window for a response signal in the receiver circuit 15. Furthermore, the magnitude of the current pulse of the output test signal is stored in the driver circuit 20. In the further sequence, one can distinguish between two cases:

Case 1: The output test signal is transformed in the receiver circuit 16 in conjunction with the receiver diode 36 into an electrical signal and then, by means of a current pulse through the transmitter diode 41, the interface circuit 26 causes the driver circuit 21 to return a response signal. If a response signal is detected in the receiver circuit 15, the processor (not shown) is caused via the interface circuit 25 to make the data to be transmitted available to the driver circuit 20 via the interface circuit 25. The driver circuit 20 transforms the data stream into optical signals through the agency of current pulses via transmitter diode 40, the magnitude of the current pulses corresponding to the last stored value of the trigger current on outputting the test signal.

Case 2: If no response signal is detected in the receiver circuit 15 in the predetermined time window, the interface circuit 25 initiates in another time window the output of another test signal from the driver circuit 20 by means of a next higher current value through the transmitter diode 40. This operation is repeated until a response signal is detected in the receiver circuit 15.

The circuit elements of FIGS. 2 and 3 described below refer to the transmitter portion of the integrated transceiver circuit 10, i.e. the driver circuit 20. The driver circuit 20 ensures that precise current pulses with programmable, i.e. settable, current can be generated for a higher data transfer rate of several Mbit/s. Only by being able to program the current pulses is it possible to determine the minimum necessary current intensity for the actual transmission path as shown in FIG. 1 in order to minimize the current consumption. By these means, it is possible, for example, to extend the life of the battery in such cases where the transceiver circuit 10 is used in a battery-powered device.

Figure 2:
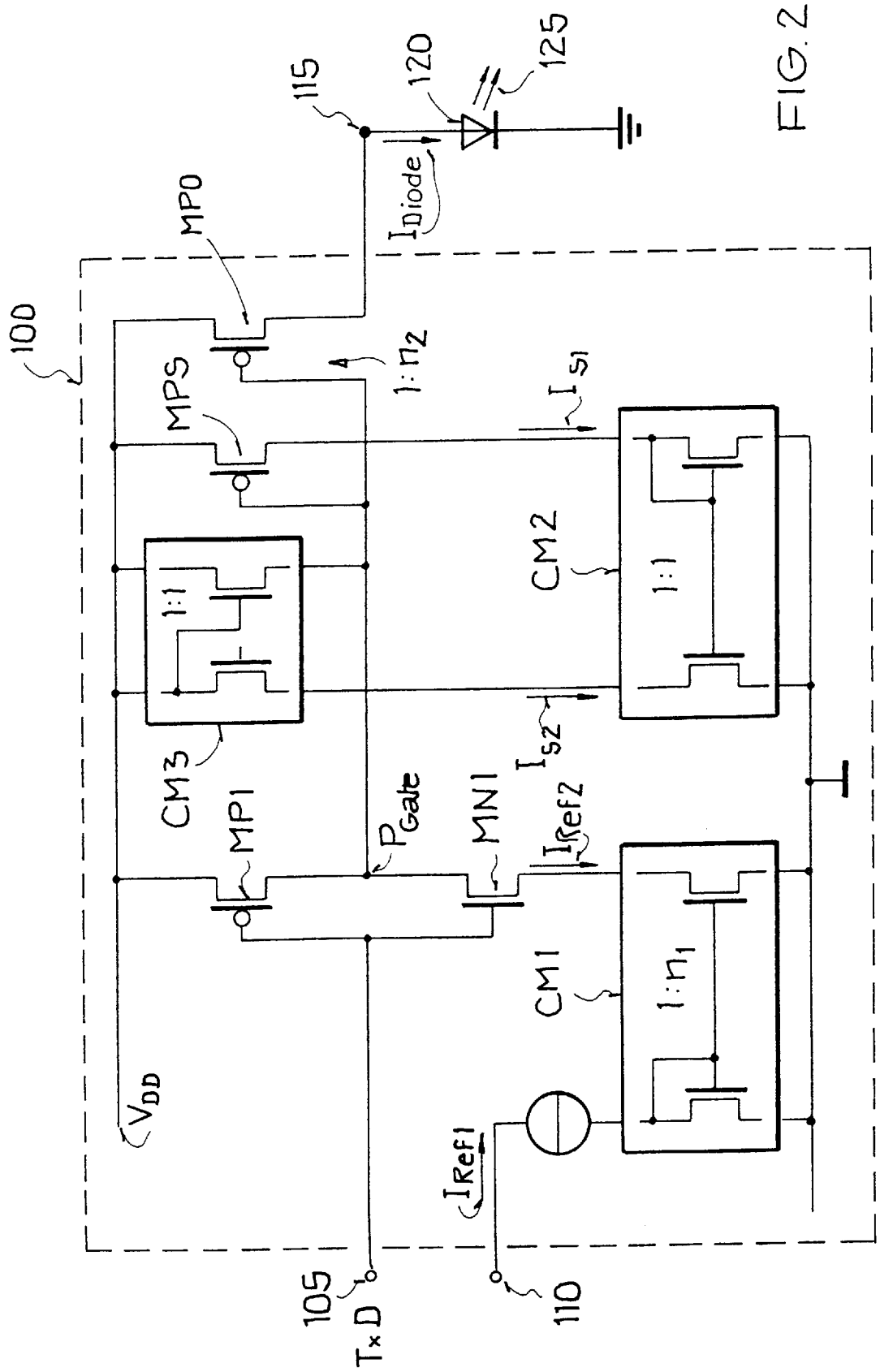
FIG. 2 a circuit diagram of a driver circuit according to the invention for use in an example embodiment in accordance with FIG. 1.

FIG. 2 shows a circuit diagram of a driver circuit 100 which is implemented, for example, in CMOS technology. The driver circuit 100 has a first input terminal 105 to which a digital input signal TxD (Transmit Data Signal) is applied, a second input terminal 110 to which a first reference current $I_{Ref1}$ is applied, and an output terminal 115 at which the driver current $I_{Diode}$ is output. The driver circuit 100 also includes a switching device MN1, MP1, a measuring transistor MPS, an output transistor MP0 and three current mirrors CM1, CM2 and CM3. In the example of embodiment described here, both the measuring transistor MPS and the output transistor MP0 are PMOS transistors or p-channel MOSFETs to the source of which a supply voltage $V_{DD}$ is applied.

The drain terminal of the output transistor MP0 is connected to the output terminal 115 of the driver circuit 100. The gate terminal of both the measuring transistor MPS and of the output transistor MP0 are connected to a circuit junction point PGate. The drain terminal of the measuring transistor MPS is connected via the two current mirrors CM2, CM3 to the circuit junction point PGate for voltage isolation. The above mentioned switching device consists of a PMOS transistor MP1 and a NMOS transistor MN1 whose gate terminals are connected to the first input terminal 105. While the PMOS transistor MP1 of the switching device is connected between the supply voltage $V_{DD}$ and the circuit junction point PGate, the NMOS transistor MN1 of the switching device is connected between the circuit junction point PGate and the current mirror CM1 which in turn is connected between the second input terminal 110 and the NMOS transistor MN1. While the current mirrors CM1, CM2 are connected to ground, the current mirror CM3 is connected to the supply voltage $V_{DD}$. As can be seen in FIG. 2, the anode terminal of an infrared transmitter diode 120 is connected to the output terminal 115 of the driver circuit 100, the cathode terminal of the same being connected to ground.

The mode of operation of the driver circuit 100 will now be explained. This driver circuit 100 is to deliver a precise current pulse $I_{Diode}$ with a programmable magnitude to the transmitter diode 120 so that this generates light pulses 125 with a corresponding programmed intensity.

The first reference current $I_{Ref1}$, which can for example amount to 12.5 μA, fed to the second input 110 of the driver circuit 100 is amplified by the current mirror CM1 by no as shown in FIG. 2 by the specified ratio "1:$n_1$". If the input signal TxD at the first input 105 of the driver circuit 100 is in a lower state, i.e. TxD=0), the NMOS transistor MN1 is switched off and the PMOS transistor MP1 is switched on. Subsequently in this state the circuit junction point PGate is held at voltage $V_{DD}$. If the input signal TxD for a transmission pulse changes into a higher state (TxD=1), the PMOS transistor MP1 is switched off and the NMOS transistor MN1 is switched on and at the same time reference current $I_{Ref2}$ amplified by the current mirror CM1 discharges the junction point PGate. Due to this discharge, the voltage of the circuit junction point PGate drops until the transistors MPO and MPS are switched on. Due to the circuit configuration of the transistors MPS and MPO in the manner shown and described above, the driver current flowing through the output transistor MPO and the measuring current flowing through the measurement transistor MPS have a fixed ratio to each other of 1:$n_2$. This ratio is largely determined by the ratio of the transistor widths of the two PMOS transistors MPO and MPS. The following applies:

$$W_{MPO}/W_{MPS}=n_2/1 \qquad (1)$$

In equation (1), $W_{MPO}$ specifies the transistor width of the PMOS transistor MPO, WMPs the transistor width of the PMOS transistor MPS and $n_2$ the gain ratio between the two PMOS transistors MPO and MPS.

The measurement transistor MPS then delivers at its drain terminal a measured current $I_{S1}$, which has the following relationship to the driver current $I_{Diode}$:

$$I_{S1}=I_{Diode}/n_2 \qquad (2)$$

The measured current $I_{S1}$, is fed into the circuit junction point PGate by mirroring with the current mirrors CM2 and CM3. The circuit junction point PGate is then discharged by a constant current $I_{Ref2}$ during transmission (TxD=1) and charged by a current $I_{S2}$ which is proportional to the driver current $I_{Diode}$. If the driver current $I_{Diode}$ reaches the desired value (i.e. $I_{Ref2} \cdot n_2$) the measured current $I_{S1}$, equals the reference current $I_{Ref2}$ and the voltage $V_{PGate}$ at the circuit junction point PGate reaches a fixed voltage value because the charging and discharging current from/to the circuit junction point PGate are of equal magnitude. Then, in a steady-state condition, the driver current is regulated by the feedback to the desired value $I_{Ref1} \cdot n_1 \cdot n_2$. The driver current $I_{Diode}$ therefore also reaches a fixed value and any changes due to fluctuations in temperature or supply voltage are compensated. Variations in the technology parameters are also compensated because the current mirrors CM2 and CM3 used here do not depend on the technology parameters.

At the end of a transmission pulse, i.e. when the input signal TxD changes to the low state (TxD=0), the transistor MN1 is switched off and the PMOS transistor MP1 is switched on. This causes the voltage $V_{PGate}$ at the circuit junction point PGate to be pulled up to the supply voltage $V_{DD}$ and consequently the driver current $I_{Diode}$ is reliably switched off. The measuring transistor MPS is also switched off thus causing the entire feedback to be switched off. Apart from leakage currents to the transistors in the switched off state, the driver circuit 100 then no longer needs any supply current which is supplied from the supply voltage $V_{DD}$.

It should be mentioned at this point that the doping level of the transistors and the polarity of the driver voltages can be interchanged.

Figure 3:
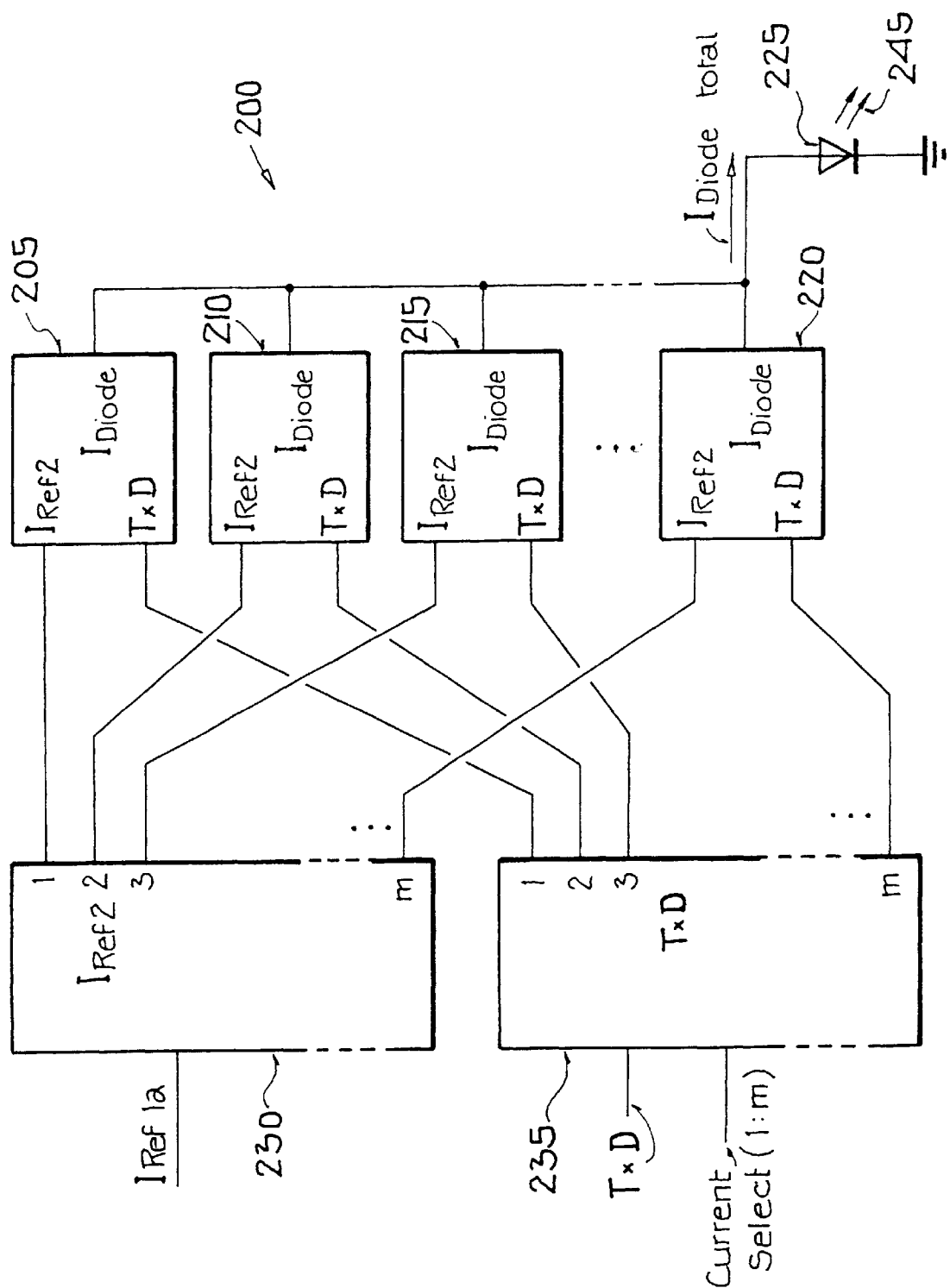
FIG. 3 a block diagram of a further driver circuit according to the invention, comprising several driver circuits shown in FIG. 2 and connected in parallel on the output side.

FIG. 3 shows a block diagram of a circuit arrangement 200 comprising a multiple of the driver circuits portrayed in FIG. 2. Whereas in the circuit shown in FIG. 2 of the driver circuit $I_{Diode}$ is programmed steplessly by varying the first reference current $I_{Ref1}$ input into the circuit, the total driver current $I_{DiodeGesamt}$ in the circuit arrangement shown in FIG. 3 can be programmed by connecting or disconnecting as required several driver circuits such as those shown in FIG. 2 whose outputs are connected together. In addition, here too the driver currents $I_{Diode}$ supplied through the individual driver circuits can be set via the reference current.

As driver stage, circuit 200 has several identical driver circuit blocks 205, 210, 215 and 220 which correspond to the circuit shown in FIG. 2 except for the omission of the first current mirror CM1, i.e. in which the second reference current $I_{Ref2}$ is fed in directly. In FIG. 3, four driver circuit blocks 205, 210, 215 and 220 are shown although, however, any number m of driver circuit blocks can be provided. The outputs of the driver circuit blocks 205–220 are connected together for current addition in order to supply the total driver current $I_{DiodeGesamt}$ which is connected to a transmitter diode 225. The driver circuit blocks 205–220 each supply a fixed driver current $I_{Diode}$.

The circuit arrangement 200 also has a reference current block 230 and a digital trigger block 235. Both blocks 230 and 235 have the same number of outputs as there are driver circuit blocks 205–220. Each output of the reference current block 230 is connected to a corresponding second input 110 (see FIG. 2) of a driver circuit block 205–220, while each output of the digital trigger block 235 is connected to a corresponding first input 105 (see FIG. 2) of a driver circuit block 205 to 220. The reference current block 230 receives at an input an input signal $I_{Ref1a}$ for a programming reference current. The digital trigger block 235 receives at two inputs the input signal TxD and a current select signal CS that determines the (1 to m, or "1:m") driver circuit blocks 205–220 that are to be connected or disconnected. The total driver signal $I_{DiodeGesamt}$, resulting from addition of all driver signals $I_{Diode}$ of all driver circuit blocks 205–220, is supplied to the transmitter diode 225 for one transmission signal 245. The mode of operation of circuit 200 shown in FIG. 3 will now be explained. The several driver circuit blocks 205–220 each deliver a fixed driver current $I_{Diode}$ of, for example, 50 mA. For this purpose, the reference current block 230 supplies all driver circuit blocks with a fixed reference current $OI_{Ref2}$ of equal magnitude, depending on the reference current $I_{Ref1a}$. Depending on the desired current value, the current select signal CS through the digital trigger block 235 is used to switch on one, several or all driver circuit blocks 205–220 in accordance with a digital decoding function in the digital trigger block 235. Consequently, a suitable number of driver circuit blocks 205–220 can be switched on via the current select signal in order to supply to the transmitter diode 225 a driver signal $I_{DiodeGesamt}$ with a sufficient magnitude corresponding to the total of all individual driver currents $I_{diode}$ of the switched-on driver circuit blocks. If there are, for example, eight driver circuit blocks then it is possible to set a driver current $I_{DiodeGesamt}$ of 50, 100, 150, ... 400 mA. It should be noted that it is not essential for the reference currents $I_{Ref2}$ for the driver circuit blocks 205–220 to be of equal magnitude provided this is allowed for with regard to the current select signal CS and the decoding in the digital trigger block. Furthermore, several digital trigger blocks can be connected together at their first input so that these can be connected and disconnected at one and the same time.

It should be noted that, although specific examples of embodiment and specific implementations of these have been shown in the above drawings and description, the main features of the driver circuit according to the present invention can be realized in a different manner. For example, the current mirrors used in the driver circuit can be realized differently, and the two current mirrors that are used to input the measured current into the circuit junction point PGate can be replaced by other circuit elements in order to isolate the voltage between the output of the measurement transistor MPS and the circuit junction point PGate.

It should be noted that the present invention can also be applied for other electronic data transmission components where current pulses are used, as for example in a wire-bound transmission system.

What is claimed is:

1. Driver circuit (100) for delivering a driver current ($I_{Diode}$) to an electronic data transmission component (120) with the following features:

a switching device (MP1, MN1) which, in a first state, connects a circuit junction point (PGate) to a supply voltage ($V_{DD}$) and disconnects it from a constant reference current ($I_{Ref2}$) and, in a second state, disconnects the circuit junction point (PGate) from the supply voltage ($V_{DD}$) and connects it to the constant reference current ($I_{Ref2}$);

a voltage-controlled resistor (MPO), at the input of which the supply voltage ($V_{DD}$) is applied, the output of which delivers the driver current ($I_{Diode}$), and the control input of which is connected to the circuit junction point (PGate); and a voltage-controlled measuring resistor (MPS), at the input of which the supply voltage ($V_{DD}$) is applied, the output of which delivers a measured current ($I_{S1}$,) that has a fixed relationship to the driver current ($I_{Diode}$), and the control input of which is connected to the circuit junction point (PGate), the measured current ($I_{S1}$,) being linked to the circuit junction point (PGate) with a sign that is the inverse of that of the constant reference current ($I_{Ref2}$).

2. Driver circuit (100) in accordance with claim 1, wherein the electronic data transmission component (120) is an infrared transmitter diode (120).

3. Driver circuit (100) in accordance with claim 2, in which the switching device (MP1, MN1) consists of an NMOS transistor and a PMOS transistor, of which one (MP1) is connected between the circuit junction point (PGate) and the supply voltage ($V_{DD}$), and one (MN1) is connected between the circuit junction point (PGate) and the reference current ($I_{Ref2}$), the input signal (TxD) being applied to the gate terminal of both transistors (MP1, MN1).

4. Driver circuit (100) in accordance with claim 3, in which the switching device (MP1, MN1) receives a digital input signal (TxD), and in which the first state corresponds to a low state of the input signal (TxD) and the second state to a high state of the input signal (TxD), the PMOS transistor (MP1) being connected between the circuit junction point (PGate) and the supply voltage ($V_{DD}$), and the NMOS transistor (MN1) being connected between the circuit junction point (PGate) and the reference current ($I_{Ref2}$).

5. Driver circuit (100) in accordance with claim 4, in which the reference current ($I_{Ref2}$) is input by a current mirror (CM1).

6. Driver circuit (100) in accordance with claim 5, in which current mirror (CM1) amplifies a pre-reference current ($I_{Ref1}$) in order to deliver the reference current ($I_{Ref2}$).

7. Driver circuit (100) in accordance with claim 6, in which the voltage-controlled resistor (MPO) is an MOS transistor.

8. Driver circuit (100) in accordance with claim 7, in which the voltage-controlled measurement resistor (MPS) is an MOS transistor.

9. Driver circuit (100) in accordance with claim 8, in which in the second state the driver current ($I_{Diode}$) is a multiple of the measured current ($I_{S1}$), the ratio of the two currents being set by the ratio of the transistor widths of the two voltage-controlled resistors (MPO, MPS).

10. Driver circuit (100) in accordance with claim 9, in which the measured current ($I_{S1}$) is linked to the circuit junction point (PGate) via two current mirrors (CM2, CM3) connected in series.

11. Driver circuit (100) in accordance with claim 10, in which the driver current ($I_{Diode}$) can be set steplessly via the reference current ($I_{Ref2}$), the driver current ($I_{Diode}$) in the second state being a fixed multiple of the reference current ($I_{Ref2}$).

12. Driver circuit (100) in accordance with claim 11, in which the data transmission component (120) is connected between the output of the voltage-controlled resistor (MPO) and ground.

13. Driver circuit in accordance with claim 12, implemented in CMOS technology.

14. Driver circuit (100) in accordance with claim 13, in which the supply voltage ($V_{DD}$) is unregulated.

15. Circuit arrangement, with:

several driver circuits (205–220) in accordance with claim 1, the outputs of which, to which the driver currents ($I_{Diode}$) are delivered, are connected together in order to deliver a total driver current;

a reference current setting device (230) which supplies all driver circuits with separate reference currents ($I_{Ref2}$); and a digital trigger device (235) which connects or disconnects a specific number of driver circuits (205–220) depending on a desired driver current intensity.

16. Circuit arrangement in accordance with claim 15, in which the separate reference currents ($I_{Ref2}$) are identical.

* * * * *

UNITED STATES PATENT AND TRADEMARK OFFICE
CERTIFICATE OF CORRECTION

PATENT NO.    : 6,466,041 B1
DATED         : October 15, 2002
INVENTOR(S)   : Egerer et al.

It is certified that error appears in the above-identified patent and that said Letters Patent is hereby corrected as shown below:

Title page,
Item [56], References Cited, U.S. PATENT DOCUMENTS, after "CHU", insert -- et al. --.

Column 3,
Line 45, after "several", replace "Mbits." by -- Mbit/s. --;

Column 6,
Line 24, after "by" (second occurrence), replace "no" by -- $n_1$ --;
Line 48, after "MPO,", replace "WMPs" by -- $W_{MPS}$ --;
Line 57, after "$I_{s1}$", delete ",";
Line 63, after "$I_{s1}$", delete ",".

Column 8,
Line 10, after "current", replace "$I_{diode}$" by -- $I_{Diode}$ --.

Signed and Sealed this

Eighteenth Day of February, 2003

JAMES E. ROGAN
*Director of the United States Patent and Trademark Office*